Patented Nov. 5, 1935

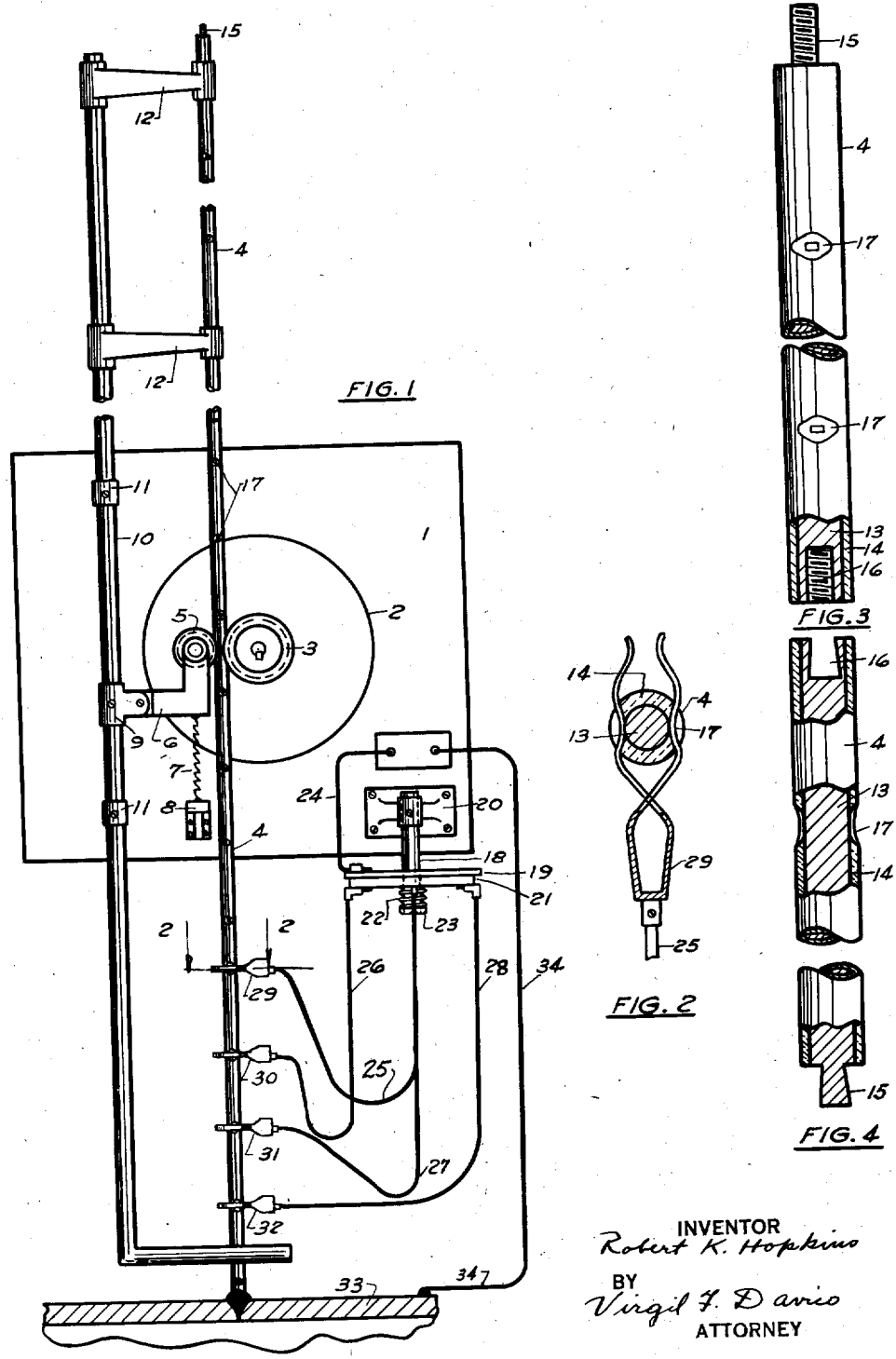

2,019,970

UNITED STATES PATENT OFFICE 2,019,970

ARC-WELDING MACHINE

Robert K. Hopkins, New York, N. Y., assignor to The M. W. Kellogg Co., New York, N. Y., a corporation of Delaware Application May 11, 1932, Serial No. 610,554

9 Claims. (Cl. 219—8)

This invention relates in general to arc-welding and in particular to apparatus for carrying on as a continuous operation arc-welding in which electrodes, covered with ceramic or other non-conducting material, are used.

Because the coating of the covered welding electrodes does not allow the welding current to pass therethrough to the conducting core it is not possible to use the continuous welding machines designed to handle bare welding electrodes. The present practice is to carry on arc-welding with covered welding electrodes as an intermittent operation by the use of machines which include a current carrying welding head adapted to have fastened thereto a bare end of the covered welding electrode. The welding head is suitably actuated and controlled to move, together with the rod or electrode fastened thereto, toward the weld at a speed and in a manner necessary to maintain the desired character of arc.

As the welding current is passed to the electrode through a fixed point or fixed points at the end fastened to the welding head of the machine, the prolonged passage of current will excessively heat this end of the electrode and will cause disintegration of the coating. To efficiently use the rod or electrode, it must be kept to such a length that the greater portion thereof is used before the disintegration of the coating takes place. Due to the present practice of using high amperages the electrode length is necessarily very short. Also, since the welding head cannot be brought too close to the arc, a definite portion of the electrode, usually about 15%, must be wasted.

When the maximum allowable portion of the electrode has been used, the arc must be broken and the head retracted to the original position for the removal of the remainder of the used electrode and the fastening thereto of a new electrode. Since the speed of travel of the welding head is the same in both directions of travel at least one-half of the operating time of the machine is taken up in retracting the head and changing electrodes. The interval between the breaking of the arc and starting of a new electrode is sufficiently long to cause a substantial cooling of the weld, this, coupled to the fact that the metal deposited when a new arc is started is generally porous, necessarily causes weak spots along the weld.

This invention contemplates apparatus for carrying on arc-welding with covered welding electrodes as a continuous operation uninterrupted for the changing of electrodes and in which the whole of the welding electrode is used.

The invention also contemplates a ceramic or other non-conducting material covered welding electrode of indefinite length made up of an indefinite number of easily joined sections which have small areas of metallic core exposed at points spaced apart along the length through which the welding current may be passed to the core.

The particular nature of the invention, as well as other objects and advantages thereof, will appear most clearly by reference to the accompanying drawing, wherein Figure 1 is a front elevation of an arc-welding machine embodying a preferred form of the invention, Figure 2 is a sectional plan view taken on line 2—2 of Figure 1 showing a current conducting clip encircling the electrode, Figure 3 is a part sectional view of a preferred form of the welding electrode of the invention, and Figure 4 is a view similar to Figure 3 with the welding electrode rotated through 90 degrees and showing a different form of connecting means.

Referring to the drawing:

The welding current generator, the control means therefor, as well as the welding electrode oscillating motor, etc., which per se form no part of this invention, will for the purpose of this description be considered as located in rear of the panel 1, with the welding electrode oscillating motor mounted to oscillate panel 1. A welding electrode feeding motor 2, the control means of which (not shown) is located at the rear of panel 1, is mounted on panel 1 to oscillate therewith. A grooved wheel 3 is keyed to the shaft of motor 2 and engages a portion of the bottom section of the welding electrode 4. The diametrically opposite portion of welding electrode 4 is engaged by a grooved wheel 5 which is mounted in a pivoted bracket 6. A spring 7 has one end anchored in a loop at the bottom of bracket 6, its other end being anchored in a loop on a bracket 8, which is bolted or otherwise fastened to panel 1. Spring 7 constantly urges wheel 5 into contact with welding electrode 4 and causes it to bear against wheel 3 with sufficient pressure to prevent slippage. The contact portions of wheels 3 and 5 are made of fibre or some such material to prevent damage to the electrode covering as welding electrode 4 passes between them.

The member 9 supports the pivot of bracket 6 and is fastened to an L-shaped guide member 10 which is in turn fastened by means of brackets 11 to panel 1 to oscillate therewith. The upper portion of guide member 10 has fastened thereto spaced guide brackets 12 through which pass the sections of the welding electrodes 4 on their way to wheels 3 and 5. The lower portion of guide member 10 is provided with a guide hole through which passes the welding electrode 4 as it approaches the arc.

The welding electrode 4 is made up of an indefinite number of sections, that is to say, as one section is consumed, another is added to the remaining section, or sections, and this procedure continued indefinitely. Each section, as shown in Figures 2-4, comprises a metallic core 13 about which is formed a covering 14 of ceramic or other non-conducting material. One end of each section is provided with the male member 15 and the other end with the female member 16 of a joint forming means. The specific form of joint forming means is not very important. It must, however, be such that the sections may be easily and quickly joined and the joint must be sufficiently strong to support the weight of the welding electrode 4 below the wheels 3 and 5, also it must give a sufficiently intimate metal to metal contact to allow the passage of the necessary welding current. In addition, the joint must be such that there is not a substantial gap between the end of one section and the beginning of the next. Figure 3 shows a section provided with the members of a threaded joint and Figure 4, a section provided with the members of a dove-tail joint.

To provide for the passage of the welding current from the current supply to the metallic core 13 of the welding electrode 4, portions of the covering 14, equally spaced apart along the length of the electrode 4 are ground out or otherwise removed to expose or substantially expose small areas of the metallic core 13. The voids 17 in electrode covering 14 thus produced approximate a frustrum of a cone in shape and as shown in Figures 2-4, expose but a small portion of the electrode core 13 while they allow ready access for contact therewith. The shape of voids 17 may be varied but to produce the result intended, it is essential that but a small area of the surface of metallic core 13 be exposed and a minimum amount of the circumference of the covering 14 adjacent core be broken. If too much of the circumference of core 13 is exposed, a part of covering 14 immediately below the exposed portion will fall into the crater of the weld as the exposed portion comes into the arc. This covering material might later be covered with metal and thus seriously weaken the weld.

In the preferred form of welding electrode 4 voids 17 are provided at diametrically opposite portions thereof, at points equally spaced apart along the length thereof. This construction is very satisfactory but the invention is not limited thereto as the voids 17 might be made on one side only or staggered. The invention may be practiced successfully with voids 17 unequally spaced apart on electrode 4, but no advantage is gained by such uneven spacing and the manufacture of the welding electrode is unnecessarily complicated.

A shaft 18, on the lower end of which is fixedly mounted a disc 19, is supported against rotation in a bracket 20 which in turn is fastened to panel 1. A circular turntable 21 is rotatably mounted on shaft 18 below disc 19 and is held in contact with disc 19 by means of spring 22 which is interposed between nut 23 on shaft 18 and the bottom of turntable 21. The pressure exerted by spring 22 is such that the contiguous faces of disc 19 and turntable 21 are maintained in such contact as to allow the welding current to pass from disc 19 to turntable 21. Spring 22 also serves to prevent any undesired rotation of turntable 21.

One side of the welding current source is connected to disc 19 by a cable 24. On the bottom of turntable 21 are fastened four cables 25, 26, 27 and 28 of substantially equal length which terminate respectively in spring clips 29, 30, 31, and 32. The ends of cables 25, 26, 27, and 28 are spaced 90 degrees apart, adjacent the periphery of turntable 21. Clips 29, 30, 31, and 32 are adapted to encircle welding electrode 4 and lead current from turntable 20 to the exposed areas of the welding electrode at voids 17. The other side of the welding current source is connected to the work 33 through cable 34.

To start the welding operation, a section of the welding electrode 4 is passed through guides 12 to feed wheel 3 which controls its further movement. As the first of voids 17 passes panel 1 on its way to the work 33, the operator of the machine will grasp one of the clips 29, 30, 31, and 32, clip 32 for instance, and turn it through a full turn in the direction opposite to which turntable 21 is to be turned to put a twist in cable 28. After this is done, clip 32 is made to encircle rod 4 and make contact with the area of core 13 exposed by that one of voids 17. When the next void 17 passes panel 1, the operator will grasp clip 31, turn it through a complete turn, and pull on it to cause cable 27 to turn turntable 21 through 90 degrees. When this is done, clip 31 is made to encircle welding electrode 4 and make contact with the area of core 13 exposed by the second one of voids 17. When the third and fourth ones of voids 17 pass panel 1, the procedure outlined is repeated with clips 30 and 29. The work 33 is then connected to cable 34, the welding current turned on, and the arc struck.

As the welding electrode 4 is consumed and the first of voids 17 and clip 32 approaches the hole in guide 10, the operator will remove clip 32 from electrode 4, pull on clip 32 or cable 28 to rotate turntable 21 through 90 degrees and after this is done, place clip 32 on electrode 4 to contact with the area of core 13 exposed by the void 17 next adjacent to the one in contact with clip 29. This procedure is repeated as each successive ones of the clips and voids approach the hole in guide 10. It is to be noted that the rotation of turntable 21 will twist cables 25, 26, 27, and 28, and if uncompensated for would soon snarl these cables, the undesired snarling is avoided by giving each of cables 25, 26, 27 and 28 the initial twist mentioned. When the upper end of the section of the welding electrode 4 approaches feed wheel 3, a second section is passed through guides 12 and joined to the first section.

Four cables 25, 26, 27, and 28 have been shown in the preferred embodiment but the invention is not limited to this number, as three or more can be successfully used. The requirement being that a sufficient number be used so that the welding current is passed to welding electrode 4 at all times through a plurality of points. If this is done, there is no danger of interrupting the arc and sparking upon the making or breaking of contact with the exposed areas of core 13 of electrode 4 completely eliminated.

While a preferred form of the apparatus has been shown and described, it is to be understood that the invention may be embodied in other forms and that various changes may be made in the structural details without departing from the principle of the invention as defined in the appended claims.

I claim:

1. In an arc-welding machine adapted to use a welding electrode having a conducting core and a non-conducting covering scored at spaced intervals to expose small areas of said core, means for feeding the electrode to the arc, welding current supply means and manually operable means for connecting the exposed areas of the electrode to said current supply means as the exposed areas pass on their way to the arc, said connecting means being manually operable to disconnect said exposed areas from said current supply means as said exposed areas approach the arc.

2. In an arc welding machine adapted to feed a welding electrode to an arc struck between the electrode and the work, means for feeding the electrode to the arc, a member rotatable about an axis parallel to the path through which said feeding means moves the electrode, current conducting means connected to said rotatable member adapted to connect said rotatable member to the electrode, welding current supply means, and current conducting means connecting said current supply means to said rotatable member.

3. In an arc-welding machine adapted to use a welding electrode having a conducting core and a non-conducting covering scored at spaced intervals to expose small areas of said core, means for feeding the electrode to the arc, welding current supply means, a rotatable member, current conducting means connecting said rotatable member to said supply means, and current conducting means fixed to said rotatable member operable to connect the exposed areas of the electrode to said rotatable member and operable to disconnect said exposed areas from said rotatable member.

4. In an arc-welding machine adapted to use a welding electrode having a conducting core and a non-conducting covering scored at spaced intervals to expose small areas of said core, means for feeding the electrode to the arc, current supply means, and manually positionable means for passing current from said current supply means to a plurality of the exposed areas of the electrode.

5. In an arc-welding machine adapted to use a welding electrode having a conducting core and a non-conducting covering scored at spaced intervals to expose small areas of said core, means for feeding the electrode to the arc, welding current supply means, a rotatable member, current conducting means connecting said rotatable member to said current supply means and means connected to said rotatable member for continuously conducting current from said rotatable member to a plurality of the exposed areas of the electrode as said electrode is fed to the arc.

6. In an arc welding machine the combination of means for feeding an electrode to the arc, welding current supply means, a rotatable member, means for conducting current from said supply means to said member, and means connected to said rotatable member and equally spaced about the circumference thereof for conducting current from said member to the electrode.

7. In an arc-welding machine adapted to use a welding electrode having a conducting core and a non-conducting covering scored at spaced intervals to expose small areas of said core, means for feeding the electrode to the arc, welding current supply means, a rotatable member, current conducting means connecting said rotatable member to said supply source, and means connected to said rotatable member and equally spaced around the circumference thereof for continuously conducting current from said rotatable member to a plurality of the exposed areas of the electrode as said electrode is fed to the arc.

8. In an arc-welding machine, the combination of means for feeding an electrode to the arc, a support for said feeding means, a bracket fixed to said support, a shaft supported by said bracket, a circular member mounted to rotate on said shaft and a plurality of conductors terminating in clips fastened to and equally spaced around the circumference of said circular member.

9. In an arc welding machine adapted to feed a welding electrode to an arc struck between the electrode and the work, means for feeding the electrode to the arc, welding current supply means, rotatable welding current distributing means, and means connecting said current supply means to said current distributing means, said current distributing means including a plurality of manually positionable members adapted to be positioned on said electrode in a definite sequence to carry current to said electrode continuously during the operation of said machine.

ROBERT K. HOPKINS.